Nov. 30, 1965  N. HEPNER  3,220,523
SPRING CLUTCH WITH SPRING RETAINING DEVICE
Filed June 19, 1962
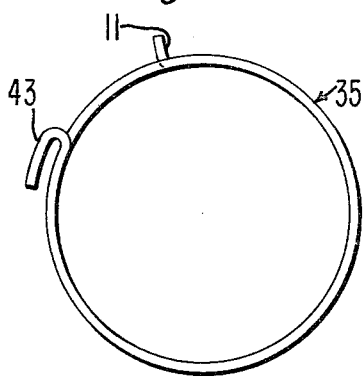
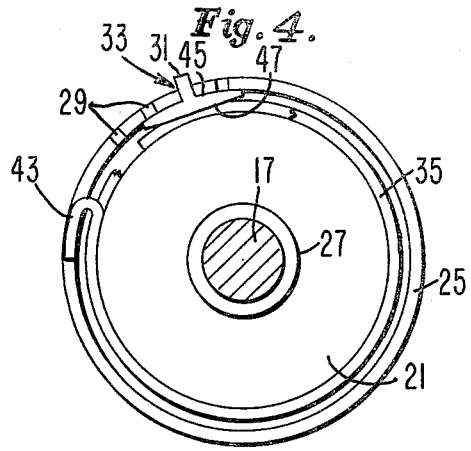
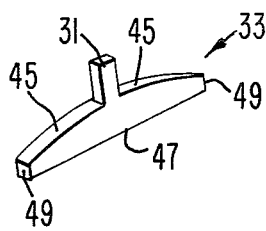
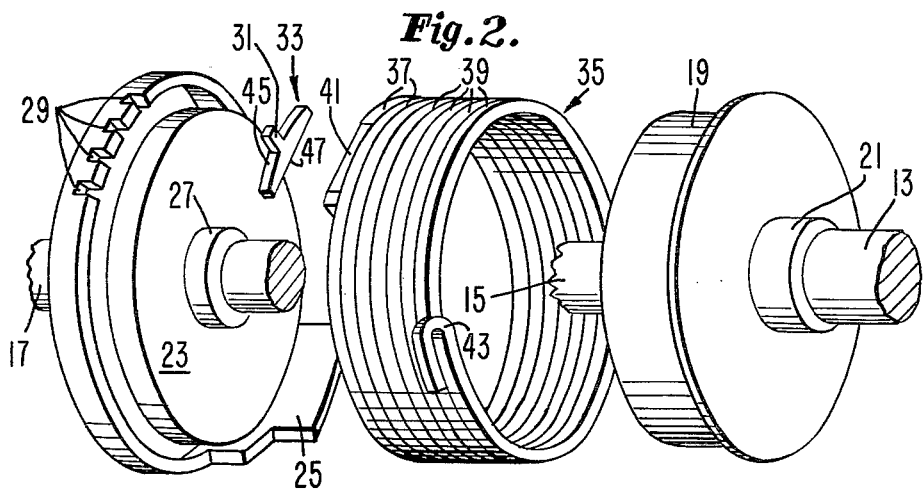
INVENTOR.
NEAL HEPNER.
BY
Charles S. Hall
ATTORNEY.

United States Patent Office 3,220,523
Patented Nov. 30, 1965

3,220,523
SPRING CLUTCH WITH SPRING RETAINING DEVICE
Neal Hepner, Birmingham, Mich., assignor to Burroughs Corporation, Detroit, Mich., a corporation of Michigan
Filed June 19, 1962, Ser. No. 203,493
6 Claims. (Cl. 192—81)

This invention relates to unidirectional spring clutches and more particularly to a retaining device for securing the fixed end of a coil spring in such a clutch mechanism.

It is common practice in a spring clutch mechanism to form the output end of the coil spring into a tab or tang by bending and then to anchor this formed end into a suitable opening in a clutch drum or housing, thereby holding the spring end in fixed relationship to a drum on which it is mounted. In situations where a spring clutch is engaged and disengaged very rapidly and at a high frequency rate, the clutch spring tends to fracture at the point of bending.

When the spring clutch is engaged, a tensile force tangential to the drum is applied to the spring. Since the tab or tang is restrained from movement, a flexing occurs in the spring at the point of bending. In the process of engaging and disengaging the clutch, therefore, a bending moment is produced upon this formed end and a maximum of stress is developed at the corner of the bend. If the bend is fairly sharp, as required in most spring clutches to apply the restraining force close to the body of the spring, the stresses produced therein are proportionately increased, resulting in fatigue and final breakage.

It is, therefore, an object of this invention to provide an improved spring retaining means for use in a unidirectional spring clutch which obviates breakage of the spring at the fixed or anchored end.

Another object of the invention is to prolong the life of a torsion spring in a clutch mechanism by subjecting it only to tensile rather than to both bending and tensile loads.

A further object of this invention is to provide a locking member, or anchor key, for securing an end of the spring in a spring clutch.

A resulting feature of the invention is the improved performance of the spring clutch resulting from complementing wedging action of applicant's invention which forces the end of the clutch spring against the output drum when the clutch is either engaged or disengaged.

Other advantages of the invention will be apparent from inspection of the drawings and specification herein below set forth.

The specific structures of a commercial adaptation of the preferred embodiment of applicant's invention have been selected for illustrative purposes in the accompanying drawings wherein:

FIG. 1 is a transverse end view of a conventional clutch spring of the prior art;

FIG. 2 is an exploded perspective viw of a unidirectional clutch mechanism embodying applicant's invention;

FIG. 3 is a perspective view of an embodiment of applicant's anchor key, and

FIG. 4 is a transverse end view showing the anchor key in its retaining position between a clutch housing and the spring.

In the embodiment of the invention illustrated herein, there is provided a plateau, as hereinafter defined, on the spring near its output end, and a locking member interacting between the plateau and a retaining area in the clutch housing. This device maintains the spring output end in a fixed relationship to the clutch output drum, and thereby eliminates the need of bending the end of the spring into a tab or tang 11 shown in the conventional spring structure of FIG. 1.

The turning efforts, which are applied to the spring in a spring clutch, tend to drive applicant's locking member, or anchor key, radially outward. This outward movement is restricted by securing the member, or key, in position within a clutch housing and the tensile loading on the spring is utilized in a wedging action to firmly secure the spring end in a fixed position.

In FIG. 2, clutch parts of a spring clutch are mounted on a continuous power shaft having an input side 13 and an output side 15 including a journal end 17. An input drum member 19 is affixed to the shaft input side 13 by any suitable method such as welding or swaging a hub 21 upon the shaft. An output drum member 23 is affixed to a cylindrical clutch housing 25 and is centrally bored for retaining a journal bushing 27 therein to assemble the drum 23 and housing 25 rotatable on the shaft output side 15. A clutch housing 25 in this embodiment of applicant's invention contains at least one slot or notch 29 wherein a tang, or keeper, 31 of a locking member, or anchor key, 33 is selectively placed when in the secured position.

A helical clutch spring 35, as shown in FIG. 2 in a relaxed condition, is of generally cylindrical form having output-drum associated coils 37 and input-drum associated coils 39. A plateau 41, preferably of flat configuration, is provided on the clutch spring 35, as by forming, removing or cutting away a segment from its outer edge slightly displaced from the output end of the output-drum associated coils 37. A formed ear 43 is provided at the end of the input-drum associated coils 39 for the purpose of releasing the clutch when coming into contact with an arm or some other tripping means not shown.

The structure of locking member, or anchor key, 33 embodied in this improved spring retainer is of segmental cross-section as shown in FIG. 3, for use in this embodiment of applicant's device. A tang, or keeper, 31 projects from arcuate shoulders 45, said shoulders having a curvature complementary to the inner surface of the clutch housing 25. The surface 47 on the key opposite the arcuate shoulders 45 is shown as being of straight flat configuration to interact with the similarly contoured plateau 41 located on the terminal coil of the output-drum associated coils 37. In this preferred commercial adaptation of applicant's invention, the shoulders 45 and surface 47 intersect squared and sections 49. While straight flat configurations for the surfaces 41 and 47 may be most expedient from a manufacturing standpoint, these cooperating surfaces could be slightly curved or arcuate imparting thereto somewhat of a lenticular or concave shape, FIG. 4 shows the locking member, or anchor key, 33 in its retaining position between the spring 35 and the clutch housing 25. To assemble the clutch spring parts, as shown in FIG. 4, the tang 31 of anchor key 33 is slipped into a slot or notch 29 and the arcuate shoulders 45 are firmly engaged with the associated internal surface of clutch housing 25. The output-drum associated coils 37 are slipped upon the output drum member 23 with the plateau 41 sliding under the flat surface 47 of anchor key 33. The journal end 17 of shaft output side 15 is inserted into the journal bushing 27 and the input-drum associated coils 39 are engaged about the outer periphery of the input drum member 19.

It is apparent that slot or notch 29 need not extend through the housing 25 as shown in FIG. 2 and that the keeper 31 may be a short stud. Alternatively, multiple studs, ridges or other structure provided on the anchor key can interact with complementary depressions or troughs provided in the inside surface of the clutch housing to secure the key in position with respect to the housing. It is also clear that, for the purpose of applicant's invention, the housing 25 need not comprise more than a portion overlying the output end of the spring.

It is further apparent that in the assembled condition, the clutch is engaged driving the output drum during the clockwise rotation of the power shaft, as shown in FIG. 2, until the formed ear 43 strikes a release arm or other tripping means, not shown, to unwrap the spring from the drum assembly and disengage the drums.

In this commercial adaptation, the spring clutch is arranged to intermittently drive a rotary load deriving power from a continuous rotating shaft running through the clutch. This rotary load may be in the form of pulleys, drive cams and the like, not shown, affixed to the output drum, or an integral extension thereof, which will furnish driving power to other mechanisms, not shown.

The operation of applicant's invention employs the particular features inherent in the plateau 41 arising from the fact that it intersects the normal curvature of the spring in both directions and produces a varying reduction in the cross-section of the spring along the length of the plateau portion 41 thereof. This intersection provides two complementing wedges which interact with the key and output drum. During clutch engagement the force exerted by the spring induces a wedging action by the plateau area nearest the spring end and upon disengagement there is a like interaction by the plateau area farthest from the spring end.

Applicant has noted that there is increased efficiency in a clutch incorporating his novel retaining device. In actual operation, applicant's clutch keys have demonstrated that this improvement has resulted because of the closer contact of the spring and the drum induced by the wedging action feature.

From the foregoing, it will be seen that applicant has provided a clutch spring retainer of more durable construction wherein the fixed spring end is secured with increased firmness by means of a simple locking member or anchor key so constructed as to be used in any clutch employing a helical spring. In this embodiment is found a particular advantage over the prior art in that the severe stresses causing fatigue and the final spring breakage have been reduced to a minimum.

Although applicant's invention was developed in connection with a spring clutch arranged for intermittent drive of a rotary load from a continuous power shaft, it is understood that this device is employable in conventional spring clutches having an input and an output drum each secured upon separate coaxial shafts, and, depending upon the nature and construction of the spring clutch or device, the retaining means could be employed on either end or even both ends of the coil spring. It is also apparent that this device is usable to secure any elongated concave band in a fixed relationship within a housing member, and, therefore, its use is not restricted to spring clutch adaptations only.

What I claim is:

1. In a spring clutch having a housing and a helical spring with ends respectively encompassed about an input drum and an output drum in a continuous coiled formation, spring retaining means comprising: a pair of complementary wedge portions formed by a flat area on said spring intersecting the curved outer surface of the spring at two lines along the length thereof and slightly displaced from the output end of the spring encompassing the output drum, and a flat faced locking member frictionally engaged with said flat area and rigidly engaged with said housing.

2. In an output mechanism for a spring clutch having a continuous torsion spring of constant diameter having opposite ends coiled about an ouput drum and an input drum respectively, a spring retaining means comprising: two complementary wedges in the spring formed by a cut-away portion on the outer surface of said spring slightly displaced from the output drum coiling end thereof, an arcuate housing having a securing means overlying the output drum coiling end of said spring, and an anchor key of substantially segmental contour having one side complementary to said housing, including said securing means, and an opposite side shaped to conform to said cut-away portion.

3. The combination as described in claim 2 wherein said securing means is a slot in said housing.

4. In a housing having a cylindrical support means within said housing, and an elongated concave band with one side engaged by the outer surface of said support means near an end of said band, a retaining device for said band comprising: a plateau on the band surface opposite said engaged side and slightly displaced from said end of said band, securing means in said housing overlying said plateau, and an anchoring means having a surface shaped to conform to and frictionally engaged with said band plateau and having keeper means coacting with said securing means.

5. In a undirectional clutch mechanism having a housing of substantially arcuate internal periphery, an energizing drum and an output drum mounted upon a power shaft, and a torsion coil spring with an input terminus and an output terminus coupling said drums, a spring retaining device comprising: at least one slotted opening in said housing, an anchor key having arcuate shoulders engaged by the internal periphery of said housing, an upward rectangular tang between said shoulders encompassed by said opening, and a flat side opposite said shoulders, and a cut-away area on the surface of said spring intersecting the normally curved surface at two lines along the length thereof, slightly displaced from the output terminus of said spring and engaged by the flat side of said key.

6. In an output mechanism for a spring clutch having an arcuate housing and a continuous torsion spring having ends coiled respectively about an output drum and an input drum, spring retaining means comprising a plateau on the outer surface of said spring slightly displaced from the end coiled about said output drum, a key having an arcuate side conforming to said housing and a smooth flat side frictionally interacting with said plateau, and means for securing said key against movement with respect to said housing.

References Cited by the Examiner

UNITED STATES PATENTS

| | | |
|---|---|---|
| 2,055,239 | 9/1936 | Mattlau. |
| 2,425,731 | 8/1947 | Dodwell. |
| 2,829,748 | 4/1958 | Sacchini et al. |
| 3,004,804 | 10/1961 | Pinkus et al. _____ 308—73 |

FOREIGN PATENTS

| | | |
|---|---|---|
| 1,903 | 1/1906 | Great Britain. |

DAVID J. WILLIAMOWSKY, *Primary Examiner.*

ROBERT C. RIORDON, *Examiner.*